(12) United States Patent
Magistrali et al.

(10) Patent No.: US 10,889,655 B2
(45) Date of Patent: Jan. 12, 2021

(54) DESTRUCTURED STARCH DERIVATIVES AND ELASTOMER COMPOSITIONS CONTAINING THEM

(71) Applicant: NOVAMONT S.P.A., Novara (IT)

(72) Inventors: Paolo Magistrali, Novara (IT); Sebastia Gesti'Garcia, Turin (IT)

(73) Assignee: NOVAMONT S.P.A., Novara (IT)

( * ) Notice: Subject to any disclaimer, the term of this patent is extended or adjusted under 35 U.S.C. 154(b) by 0 days.

(21) Appl. No.: 15/537,440

(22) PCT Filed: Dec. 17, 2015

(86) PCT No.: PCT/EP2015/080234
§ 371 (c)(1),
(2) Date: Jun. 19, 2017

(87) PCT Pub. No.: WO2016/097151
PCT Pub. Date: Jun. 23, 2016

(65) Prior Publication Data
US 2017/0362344 A1 Dec. 21, 2017

(30) Foreign Application Priority Data
Dec. 19, 2014 (IT) .............................. MI2014A2192

(51) Int. Cl.
| | | |
|---|---|---|
| C08B 31/00 | (2006.01) | |
| C08B 31/08 | (2006.01) | |
| C08L 3/08 | (2006.01) | |
| C08L 7/00 | (2006.01) | |
| B60C 1/00 | (2006.01) | |
| C08L 3/04 | (2006.01) | |
| C08L 21/00 | (2006.01) | |
| C08K 5/00 | (2006.01) | |
| C08L 9/06 | (2006.01) | |

(52) U.S. Cl.
CPC .............. *C08B 31/006* (2013.01); *B60C 1/00* (2013.01); *C08B 31/003* (2013.01); *C08B 31/08* (2013.01); *C08K 5/0016* (2013.01); *C08K 5/0025* (2013.01); *C08L 3/04* (2013.01); *C08L 3/08* (2013.01); *C08L 7/00* (2013.01); *C08L 9/06* (2013.01); *C08L 21/00* (2013.01)

(58) Field of Classification Search
CPC ................................ C08B 31/00; C08B 31/08
See application file for complete search history.

(56) References Cited

U.S. PATENT DOCUMENTS

| | | | | |
|---|---|---|---|---|
| 4,255,485 A * | 3/1981 | Yau | ........................ | C03C 25/28 156/335 |
| 4,579,944 A * | 4/1986 | Harvey | ................ | C08B 31/125 106/206.1 |
| 4,973,680 A * | 11/1990 | Billmers | ................. | C03C 25/40 162/164.1 |
| 5,410,037 A * | 4/1995 | Wagner | .................. | C07H 23/00 536/101 |
| 5,672,639 A * | 9/1997 | Corvasce | ................. | B60C 1/00 152/450 |
| 5,844,058 A * | 12/1998 | Sugama | ................. | A01N 25/10 527/300 |
| 6,273,163 B1 | 8/2001 | Materne et al. | | |
| 6,821,588 B1 * | 11/2004 | Hammer | ............ | A22C 13/0013 428/34.8 |
| 2002/0061943 A1 * | 5/2002 | Berger | ................. | C08G 77/442 524/47 |
| 2003/0065062 A1 * | 4/2003 | Corvasce | .................. | C08L 9/06 524/47 |
| 2003/0069332 A1 * | 4/2003 | Agostini | .................. | C08J 3/205 523/205 |
| 2003/0092801 A1 * | 5/2003 | Agostini | ................ | C08K 5/548 524/27 |
| 2003/0109625 A1 * | 6/2003 | Galimberti | ............ | B60C 1/0016 524/495 |
| 2003/0232915 A1 * | 12/2003 | Corvasce | .............. | B60C 9/0007 524/502 |
| 2004/0019135 A1 * | 1/2004 | Horiguchi | ............. | B60C 1/0016 524/47 |
| 2004/0024093 A1 * | 2/2004 | Weydert | .................... | C08L 7/00 524/47 |
| 2004/0182486 A1 * | 9/2004 | Bernard | ................ | B60C 9/0042 152/209.12 |
| 2005/0228173 A1 * | 10/2005 | Lai | .......................... | C08B 30/00 536/53 |
| 2006/0107945 A1 * | 5/2006 | Narayan | ................. | C08B 31/04 127/32 |
| 2010/0311905 A1 * | 12/2010 | Mentink | ............ | C08G 18/0895 525/54.31 |

FOREIGN PATENT DOCUMENTS

| | | |
|---|---|---|
| CN | 1536003 A | 10/2004 |
| EP | 2853546 A1 | 4/2015 |
| WO | WO-0017270 A1 | 3/2000 |
| WO | WO-0108584 A1 | 2/2001 |
| WO | WO-2011/138267 A1 | 11/2011 |

OTHER PUBLICATIONS

URL:http://randd.defra.gov.uk/Document.aspx?Document=NF0608_5377_FRP.doc; retrieved on Feb. 12, 2015.

* cited by examiner

*Primary Examiner* — Liam J Heincer
(74) *Attorney, Agent, or Firm* — Polsinelli PC

(57) ABSTRACT

This invention relates to new destructured starch derivatives and elastomer compositions containing them. In particular this invention relates to destructured starch silyl ethers in which at least one oxygen atom of the destructured starch is covalently bonded to at least one silicon atom and/or to at least one compound containing silicon.

14 Claims, No Drawings

DESTRUCTURED STARCH DERIVATIVES AND ELASTOMER COMPOSITIONS CONTAINING THEM

CROSS REFERENCE TO RELATED APPLICATIONS

This application is a National Phase filing under 35 U.S.C. § 371 of PCT/EP2015/080234 filed on Dec. 17, 2015; and this application claims priority to Application No. MI2014A002192 filed in Italy on Dec. 19, 2014 under 35 U.S.C. § 119. The entire contents of each application are hereby incorporated by reference.

This invention relates to new destructured starch derivatives and elastomer compositions containing them.

Hitherto elastomers have constituted a type of polymers which has been widely used for the production of many manufactured articles, such as for example packaging, tyres, expanded products, anti-vibration devices, suspensions, non-slip mats, resilient components, footwear, insulating materials and sheathing for electrical cables, tubes for various applications, conveyor belts, which are characterised by the ability to deform when force is applied and to recover their original shape when the force is removed.

If subjected to repeated force/recovery cycles the elastomers nevertheless progressively tend to alter their behaviour, gradually losing their ability to fully recover their original shape. This phenomenon, known as hysteresis, results in a gradual loss of performance which limits the service life of the articles manufactured using them, in terms of both time and use.

There is therefore a need to improve the performance of the elastomers and in particular to reduce their hysteresis phenomena so as to extend the service life of articles manufactured using these products.

In the sector of elastomer compositions it has been known for a long time that starch in a complexed or plasticised form can be used as a filler. Because of its ready availability and relatively low cost starch in fact appears to have the ideal characteristics for use as a filler, alone or in combination with for example carbon black, silica, kaolin, mica, talc or titanium oxide.

However, starch as available in nature (so-called native starch) has limited stability properties when exposed to thermal and mechanical stresses, which means that it cannot effectively be used as a filler. If added during the preparation of elastomer compositions, native starch in fact undergoes degradation phenomena. Its granular structure also makes it difficult to disperse, creating non-uniform morphologies which will prejudice the performance of elastomer compositions containing it.

In order to overcome the limited stability and difficulty of dispersion of native starch in elastomer compositions it is known that starch can be used in a complexed or plasticised form with polymers such as poly(ethylenevinyl alcohol) or poly(ethyleneacrylic acid). For example U.S. Pat. No. 5,672,639 describes elastomer compositions comprising a low melting point composite comprising starch plasticised with a plasticising polymer (EVOH). According to US '639, the use of a low melting point composite allows it to melt and mix properly during the stages of processing the elastomer composition.

It has now surprisingly been discovered that it is possible to use new destructured starch derivatives which are capable of reducing the hysteresis phenomena of elastomer compositions containing them.

In particular this invention relates to destructured starch silyl ethers in which at least one oxygen atom of the destructured starch is covalently bonded to at least one silicon atom and/or at least one compound containing silicon.

This invention also relates to a process of preparing the said silyl ethers and compositions comprising at least one elastomer and at least one destructured starch silyl ether according to this invention.

For the purposes of this invention, by destructured starch is meant a starch of any kind which has substantially lost its native granular structure. As far as the native granular structure of starch is concerned, this can be advantageously identified by phase contrast optical microscopy. In one particularly preferred embodiment of this invention the destructured starch is a starch which has completely lost its native granular structure, also known as "completely destructured starch".

As far as the compounds containing silicon are concerned, these are preferably selected from the group comprising organosilanes, including organodisilanes, organotrisilanes, organopolysilanes, halosilanes, including di-, tri- and polyhalosilanes, silanols, including di-, tri- and polysilanols, silazanes, including di-, tri- and polysilazanes. More preferably the compounds containing silicon are selected from the organosilanes, still more preferably from those having a general formula selected from:

$$(RO)_3SiC_nH_{2n}S_mC_nH_{2n}Si(OR)_3 \quad (I)$$

$$(RO)_3SiC_nH_{2n}X \quad (II)$$

$$(RO)_3SiC_nH_{2n}S_mY \quad (III)$$

in which R represents an alkyl group having 1 to 4 carbon atoms, the three R being the same or different;
"n" represents an integer from 1 to 6;
"m" represents an integer from 1 to 6;
X represents a mercaptan group, an amine group, a vinyl group, a nitroso group, an imido group, a chlorine atom or an epoxy group;
Y represents a cyanide group, a N,N-dimethyl thiocarbamoyl group, a mercaptobenzotriazole group or a methacrylate group.

Organosilanes having at least one sulfur atom are preferred and among these even more preferred are those selected from bis(3-triethoxysilyl propyl) tetrasulfide, γ-mercaptopropyl methoxysilane, 3-cyanatopropyl triethoxysilane or trimethoxysilyl propyl mercaptobenzotriazole tetrasulfide.

As far as the destructured starch silyl ethers according to this invention are concerned, these can be obtained by a process in a single stage or in several stages. Preferably the destructured starch silyl ethers according to this invention can be obtained by mixing destructured starch with at least one silicon-containing compound at temperatures of between 110 and 250° C. and preferably between 130 and 180° C. Mixing may take place in any equipment suitable for the purpose, preferably in a static mixer or in an extruder, more preferably in an extruder. During preparation of the destructured starch silyl ethers according to this invention the silicon-containing compounds may be metered in excess with respect to the starch or in any event may not be caused to react completely with the latter so that the destructured starch silyl ethers according to this invention may advantageously contain between 1 and 20% by weight of at least one silicon-containing compound, preferably organosilanes, halosilanes, silanols, and silazanes not bonded to an oxygen atom of the starch. More preferably the said silicon compound not bonded to an oxygen atom of the starch is an organosilane.

In a preferred embodiment the destructured starch silyl ethers according to this invention may be obtained by means of a process comprising the stages of:
a. preparing the destructured starch;
b. mixing the destructured starch with at least one silicon-containing compound, preferably in an extruder, at temperatures of between 110 and 250° C., and preferably between 130 and 180° C.

During stage a the starch used to prepare the destructured starch is selected from native starch, such as for example maize starch, potato starch, rice starch, tapioca starch and starch which has been physically or chemically modified, such as for example ethoxylated starch, starch acetate or starch hydroxypropylate, cross-linked starch, oxidised starch, dextrinised starch, dextrins and mixtures thereof. Preferably the starch used for preparation of the destructured starch is native starch.

The destructured starch is prepared in any equipment capable of ensuring the temperature, pressure and shear force conditions suitable for destroying the native granular structure of the starch. Conditions suitable for obtaining complete destructuring of the starch are for example described in patents EP-0 118 240 and EP-0 327 505. Advantageously the destructured starch is prepared by an extrusion process at temperatures of between 110 and 250° C., preferably 130-180° C., preferably pressures of between 0.1 and 7 MPa, preferably 0.3-6 MPa, preferably providing a specific energy of more than 0.1 kWh/kg during the said extrusion.

Preparation of the destructured starch preferably takes place in the presence of 1 to 40% by weight with respect to the weight of the starch of one or more plasticisers selected from water and polyols having 2 to 22 carbon atoms. As far as the water is concerned, this may also be that naturally present in the starch. Among the polyols those preferred are polyols having from 1 to 20 hydroxyl groups containing 2 to 6 carbon atoms, their ethers, thioethers and organic and inorganic esters. Examples of polyols are glycerine, diglycerol, polyglycerol, pentaerythritol, polyglycerol ethoxylate, ethylene glycol, polyethylene glycol, 1,2-propandiol, 1,3-propandiol, 1,4-butandiol, neopentylglycol, sorbitol monoacetate, sorbitol diacetate, sorbitol monoethoxylate, sorbitol diethoxylate, and mixtures thereof. In a preferred embodiment the starch is destructured in the presence of glycerol or a mixture of plasticisers comprising glycerol, more preferably comprising between 2 and 90% by weight of glycerol. Preferably the destructured starch silyl ethers according to this invention comprise between 1 and 40% by weight of plasticisers with respect to the weight of the starch.

During the stage of preparing the destructured starch it is also preferable to treat the starch with one or more depolymerising agents selected from organic acids, inorganic acids, for example sulfuric acid, and enzymes, preferably amylases. It has in fact surprisingly been discovered that the silyl ethers obtained from destructured starch having a low molecular weight are more readily dispersible in elastomers. Preferably the organic acids used as depolymerising agents are added to the starch in a quantity of 0.1-10% by weight with respect to the starch and are advantageously selected from citric acid, maleic acid, lactic acid, oxalic acid, gluconic acid and mixtures thereof, more preferably citric acid. As far as the inorganic acids are concerned, these are advantageously added in a quantity of 0.1-10% by weight with respect to the starch.

During stage a, or as an alternative after stage a and before stage b, it is also possible to add dispersing agents, crosslinking agents, surfactants, anti-foaming agents, suspending agents, thickening agents, and preservatives. In one preferred embodiment of this invention one or more crosslinking agents are added after stage a and before stage b.

As far as the crosslinking agents are concerned, these are preferably selected from dialdehydes and polyaldehydes, anhydrides and mixtures thereof. As far as dialdehydes and polyaldehydes are concerned, those preferred are glutaraldehyde, glyoxal and their mixtures, among these glyoxal being particularly preferred. In a particularly preferred embodiment the destructured starch is prepared in the presence of 0.1-5% by weight with respect to the starch of crosslinking agents, more preferably glyoxal. When used, the said crosslinking agents are advantageously mixed with the starch at the temperature at which the destructured starch is prepared.

In a preferred embodiment the destructured starch silyl ethers according to this invention can be obtained using a process comprising the stages of:
a. extruding at least one starch in the presence of 1-40% by weight with respect to the weight of the starch of one or more plasticisers, preferably comprising at least 2-90% by weight of glycerol with respect to the total weight of plasticisers, and in the presence of 0.1-5% by weight of at least one crosslinking agent, preferably glyoxal, with respect to the weight of the starch, at a temperature of between 110 and 250° C., preferably 130-180° C., obtaining a destructured starch;
b. mixing the said destructured starch with at least one silicon-containing compound at temperatures of between 110 and 250° C. and preferably between 130 and 180° C.

The crosslinking agent may also be added after addition of the plasticiser. In another preferred embodiment the destructured starch silyl ethers according to this invention can therefore be obtained by means of a process providing the stages of:
a. extruding at least one native starch in the presence of 1-40% by weight with respect to the weight of the native starch of one or more plasticisers preferably comprising at least 2-90% by weight of glycerol with respect to the total weight of the plasticisers at a temperature of between 110 and 250° C., preferably 130-180° C.,
a-1. reacting the starch and plasticiser extruded in stage a, preferably under the same conditions as in stage a, with 0.1-5% by weight with respect to the weight of the starch of at least one crosslinking agent, preferably glyoxal;
b. mixing the destructured starch obtained at the end of stage a-1 with at least one silicon-containing compound at temperatures of between 110 and 250° C. and preferably between 130 and 180° C.

This invention also relates to compositions comprising:
i. at least one elastomer;
ii. from 1 to 70 parts per 100 parts of component I (phr), preferably 3-30 phr, of at least one destructured starch derivative according to this invention.

As far as the elastomers are concerned, these comprise both natural rubbers (NR) and synthetic rubbers. Examples of synthetic rubbers are diene-base rubbers such as conjugated vinylarene-diene random copolymers (e.g. SBR, Styrene/Butadiene Rubber) and diene homopolymers (e.g. polybutadiene, isoprene), ethylene-propylene copolymers, in particular ethylene/propylene/diene terpolymers (EPDM, Ethylene/Propylene/Diene Monomer), and thermoplastic elastomers such as for example styrene-butadiene-styrene (SBS), acrylonitrile-butadiene (NBR) and styrene-isoprene-styrene (SIS) block copolymers. These elastomers may be used as such or in a mixture with other elastomers.

In a preferred embodiment compositions according to this invention comprise at least one elastomer selected from natural rubber, diene homopolymers, preferably polybutadiene and isoprene, styrene-butadiene-styrene block copolymers, styrene-isoprene random copolymers, styrene-isoprene-styrene block copolymers, acrylonitrile-butadiene block copolymers, and conjugated vinylarene-diene random copolymers.

In a preferred embodiment the compositions according to this invention comprise a mixture of elastomers comprising:
 a. from 30 to 90% by weight with respect to the total of components i and ii of at least one conjugated vinylarene-diene random copolymer;
 b. from 10 to 70% by weight with respect to the sum of components i and ii of at least one elastomer selected from natural rubber, diene homopolymers, preferably polybutadiene and isoprene, styrene-butadiene-styrene block copolymers, styrene-isoprene random copolymers, styrene-isoprene-styrene block copolymers or acrylonitrile-butadiene block copolymers.

Preferably the compositions according to this invention comprise from 1 to 70 parts per 100 parts of elastomer component (phr), preferably 3-30 phr, of destructured starch silyl ethers according to this invention.

Typical examples of vinylarenes are 2-vinyl naphthalene, 1-vinyl-naphthalene, styrene and corresponding alkylated compounds. In the preferred embodiment the vinylarene is styrene. The conjugated dienes are preferably 1,3-dienes having from 4 to 12 carbon atoms, more preferably from 4 to 8 carbon atoms. Examples of these dienes are 1,3-butadiene, isoprene, 2,3-dimethyl-1,3 butadiene, 1,3 pentadiene (piperylene), 2-methyl-3-ethyl-1,3-butadiene, or 1,3-octadiene. In the preferred embodiment the conjugated dienes are selected from 1,3-butadiene and isoprene, more preferably 1,3-butadiene.

In a particularly preferred embodiment the conjugated vinylarene-diene random copolymers are styrene-butadiene random copolymers. In the rest of the description reference will be made to these copolymers as being typical examples of conjugated vinylarene-diene random copolymers, without however intending to limit the scope of the description to the specific copolymers.

By the term styrene-butadiene "random" copolymer in the meaning of this invention are meant copolymers in which the styrene content in the form of blocks is 10% or less in relation to the bound styrene, as measured by the oxidative decomposition method described by I. M. Kolthoff et al., J. Polymer Science, Vol. 1, page 429 (1946), or more recently Viola et al. (Sequence distribution of styrene-butadiene copolymers by ozonolysis, high performance liquid chromatographic and gas chromatographic-mass spectrometric techniques, J. Chromatography A, 117 (1994)).

The abovementioned styrene-butadiene random copolymers have a styrene content of between 15 and 50% by weight, preferably between 20 and 50% by weight.

As is known, butadiene may be bound to the polymer chain through cis-1,4 bonds (cis bonds), trans-1,4 bonds (trans bonds) or as 1,2 bonds (vinyl bonds). The content of vinyl units is defined as the ratio between the quantity of vinyl bonds and the sum of cis, trans and vinyl bonds. The content of a vinyl unit of the diene portion of a styrene-butadiene random copolymer preferably lies between 10 and 80%. The abovementioned concentration in vinyl units may be distributed uniformly along the polymer chain, or may be increased or diminished along the chain.

The styrene-butadiene random copolymers may be obtained by any one of the processes known in the literature, preferably by means of two different processes—from solution or in emulsion.

As far as solution processes are concerned, these are preferably performed by anionic polymerisation initiated by lithium alkyls in hydrocarbon solvents. In this case the weight average molecular weight (Mw) which can be measured by exclusion chromatography is preferably between 50,000 and 1,000,000, with a distribution of the molecular weights (Mw/Mn) of between 1 and 10. Preferably Mw lies between 300,000 and 800,000 and Mw/Mn lies between 1 and 5, more preferably between 1 and 3. In the case of processes from solution the styrene-butadiene copolymers preferably have a styrene content of between 15 and 50% by weight, preferably between 20 and 45% by weight, while the content of vinyl units is preferably between 10 and 80% by weight, preferably between 20 and 70%. The molecular structure is linear or branched, the latter being obtained by reacting the active terminal groups with bonding agents such as silicon tetrachloride, tin tetrachloride or other multifunctional group bonding agents according to the known art at the end of the polymerisation. The Mooney viscosity of the polymer when not extended with ML(1+4) oil @ 100° C. preferably lies between 30 and 200 Mooney Units (MU), preferably between 50 and 150, while the corresponding polymer extended with extender oils has a Mooney viscosity at 100° C. within the range 30 to 120 MU. As regards the determination of Mooney viscosity, this is performed at 100° C. with rotor L and times (1+4) according to standard ASTM D1646. As far as processes in emulsion are concerned, these are preferably performed by free radical polymerisation. In this case, as is known, the structure of the copolymer obtained is branched because of transfer reactions on the molecular chain during the propagation stage. In the case of the styrene-butadiene copolymers obtained by means of processes in emulsion, the quantity of styrene is preferably between 20 and 50%, while the quantity of vinyl units is preferably between 15 and 25%. As is known, the vinyl units content in the styrene-butadiene copolymers can be adjusted during the free radical polymerisation processes of this kind by modulating the synthesis temperature. The Mooney viscosity of the polymer extended with extender oils, preferably has values within the range 30-120 MU at 100° C.

The compositions according to this invention may also include extender oils, fillers, reinforcing fillers, bonding agents, vulcanising agents, accelerants, activators, vulcanisation retardants, organic acids, antioxidants, process coadjuvants and other additives as known in the art.

Preferably the compositions according to this invention comprise 1-75 phr, more preferably 7-50 phr, even more preferably 10-40 phr of at least one extender oil. Preferably the extender oils are selected from vegetable oil derivatives, mineral oils and/or natural oils and mixtures thereof. As is known, extender oils can be added at different stages in preparation of the elastomer compositions. During preparation of the elastomer or during the stage of mixing the elastomer with other components (for example destructured starch silyl ethers, fillers, reinforcing fillers, vulcanising agents, bonding agents), this latter stage is also known as the compounding stage.

According to one embodiment of this invention the extender oils are added during the stage of elastomer preparation. Preferably, in the case of elastomers obtained by anionic polymerisation in solution, the extender oil is added to the polymer solution, preferably followed by additives such as antioxidants. Advantageously, at the end of anionic polymerisation in solution the solvent is removed in stirred baths heated with steam. In the case of elastomers obtained by free radical polymerisation the extender oils may be advantageously added to the aqueous emulsion, preferably followed by additives in the normal way, and by the removal of solvent after coagulation through the addition of sulfuric acid.

The elastomer so obtained (commonly also referred to as "extended oil elastomer") is therefore advantageously dried using mechanical extruders or heated stoves and subsequently formed into balls before the subsequent stages of processing.

According to another embodiment of this invention the extender oils are added to the elastomer composition during the compounding stage together with the other components such as for example destructured starch silyl ethers, vulcanising agents (e.g. sulfur) and accelerants, activators, vulcanisation retardants, organic acids, antioxidants, process coadjuvants and other additives as known in the art.

Obviously it is possible to combine the two embodiments described above by adding a proportion or a type of extender oils during the stage of preparing the elastomer and another proportion or type during the compounding stage.

As far as the extender oils derived from vegetable oils are concerned, these are advantageously selected from:

A1) mixtures of triglycerides obtained from vegetable oils comprising one or more of the following oligomer structures:

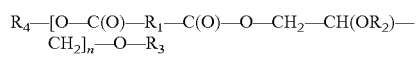

in which $R_1$ is selected from $C_2$-$C_{22}$ alkylenes, $R_2$ is selected from one or more of the following groups formed from residues of $C_6$-$C_{24}$ dicarboxylic acids esterified with monoalcohols and $C_6$-$C_{24}$ monocarboxylic acid residues, $R_3$ is selected from one or more of the following groups comprising H, $C_6$-$C_{24}$ dicarboxylic acid residues esterified with monoalcohols and $C_6$-$C_{24}$ monocarboxylic acid residues, $R_4$ is an alkyl group, n is a whole number greater than or equal to 2, the said mixture of triglycerides having a number average molecular weight (Mn) of between 800 and 10,000 Da, A2) triglycerides of one or more long chain carboxylic acids comprising at least one carboxylic acid containing vicinal hydroxide groups;

A3) polyol esters with at least one $C_6$-$C_{24}$ monocarboxylic acid and at least one $C_6$-$C_{24}$ dicarboxylic acid, the said esters not being triglycerides;

the said vegetable oil derivatives are preferably characterised by an average molecular weight of less than 10,000 g/mol. The said vegetable oil derivatives also show high stability to thermo-oxidation and high stability to hydrolysis, and are thereby particularly suitable for use in compositions for high performance applications, such as for example tyres and elastomer articles resistant to very low temperatures.

With reference to group A1, $R_1$ is preferably a $C_6$-$C_{11}$ alkylene, $C_6$, $C_7$ and/or $C_{11}$ alkylenes being particularly preferred. The two or more $R_1$ in the structure may be different from each other.

Preferably, $R_2$ is selected from $C_6$-$C_{24}$ dicarboxylic acid residues and $C_6$-$C_{24}$ monocarboxylic acid residues or mixtures thereof. The two or more $R_2$ in the structure may be different from each other.

$R_3$ preferably represents $C_6$-$C_{24}$ dicarboxylic acid residues or $C_6$-$C_{24}$ monocarboxylic acid residues.

When $R_2$ and/or $R_3$ represent $C_6$-$C_{24}$ dicarboxylic acid residues, the free acid groups in the $C_6$-$C_{24}$ dicarboxylic acid residues are esterified with straight or branched $C_1$-$C_{12}$ monoalcohols. Short chain monoalcohols such as for example methyl alcohol, ethyl alcohol, propyl alcohol and butyl alcohol are particularly preferred. Ethyl alcohol and butyl alcohol are particularly advantageous.

$R_4$ is preferably a straight or branched $C_1$-$C_{12}$ alkyl group, more preferably a $C_2$ or $C_4$ alkyl group.

In the case of group A1) of vegetable oil derivatives, by $C_6$-$C_{24}$ dicarboxylic acids are meant aliphatic diacids preferably of the alpha-omega type. Suberic acid, azelaic acid, brassylic acid and their mixtures are particularly preferred.

In the case of group A1) of vegetable oil derivatives, by $C_6$-$C_{24}$ monocarboxylic acids are meant mono acids having one or more unsaturations along the chain, and may be substituted or unsubstituted.

The preferred unsubstituted monocarboxylic acids are mono acids having a chain length of $C_{9-24}$; particularly preferred are palmitic, stearic, oleic, arachic, behenic and lignoceric acids. The preferred substituted monocarboxylic acids are long chain monocarboxylic acids with one or more ketone groups or hydroxyl groups in a non-terminal position, and among these the $C_{12}$-$C_{24}$ carboxylic acids containing at least one ketone group or $C_{12}$-$C_{24}$ hydroxy acids containing at least one secondary hydroxyl group are particularly preferred. Examples of preferred substituted monocarboxylic acids are 9-hydroxystearic acid, 9-ketostearic acid, 10-ketostearic acid and 10-hydroxystearic acid.

The said substituted monocarboxylic acids may contain two adjacent hydroxyl groups or a hydroxyl group adjacent to a ketone group. If two adjacent hydroxyl groups are present, dihydroxypalmitic, dihydroxystearic, dihydroxyoleic, dihydroxyarachic and dihydroxybehenic acids are preferred; 9,10-dihydroxystearic acid is particularly preferred.

Advantageously, the oligomer structures according to the invention are dimer or trimer esters of triglycerides having a number of repetitive units (n) equal to 2 or 3.

Particularly preferred are dimers and trimers of triglycerides containing $C_6$-$C_{24}$ dicarboxylic acid residues. Examples of preferred dimer and trimer esters are illustrated by the following structures.

9
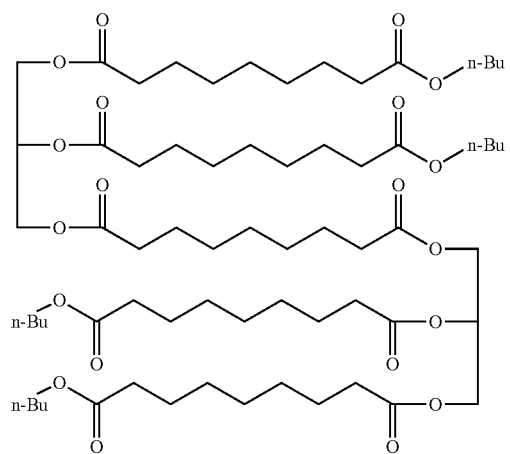
10
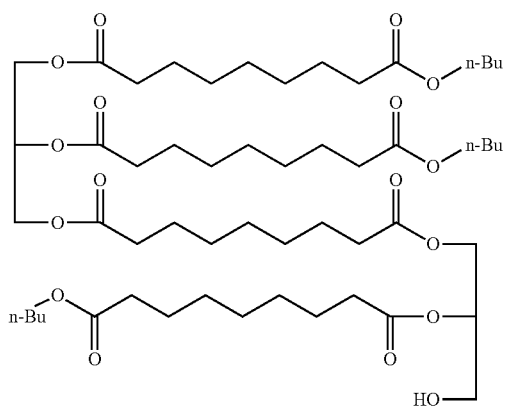
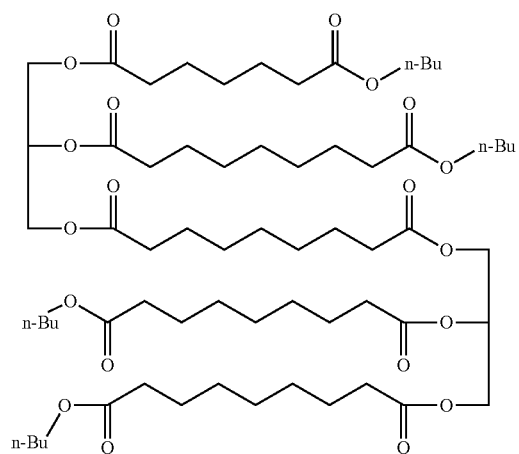
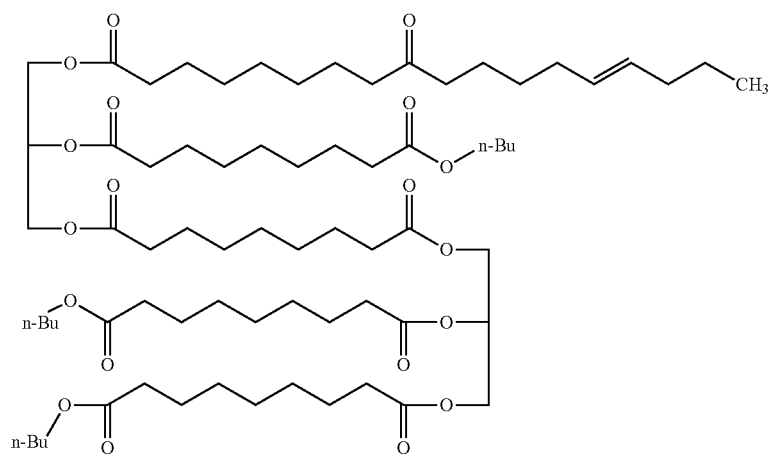

-continued

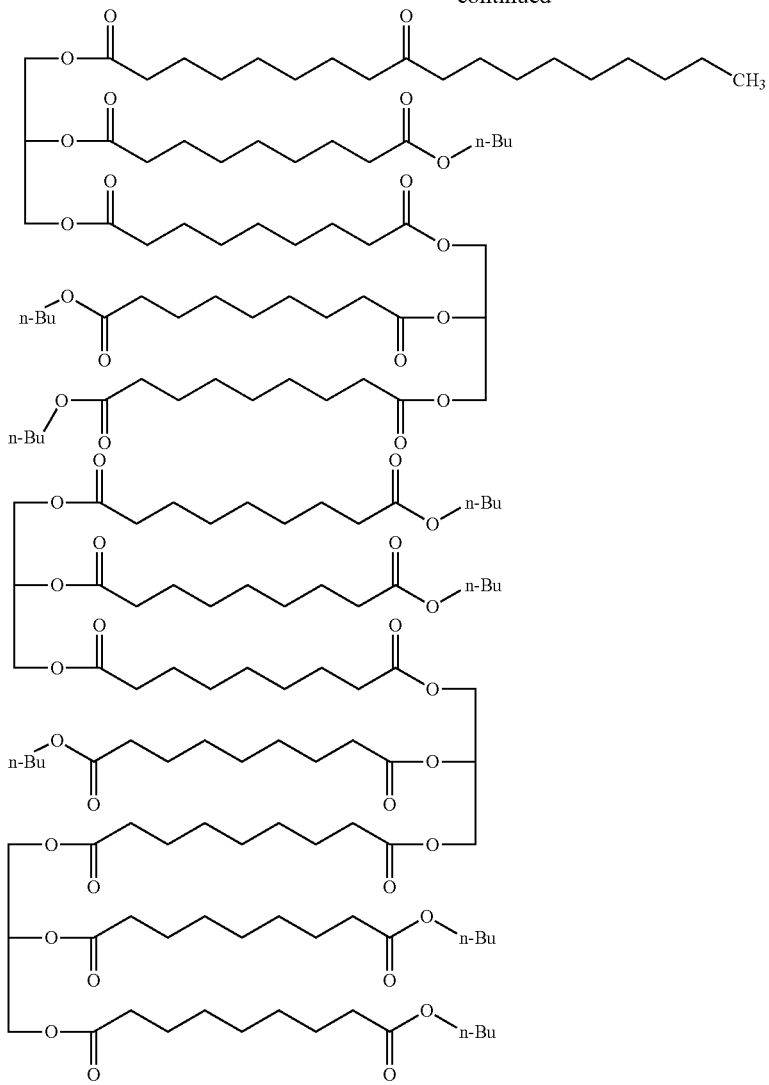

Other examples of oligomer structures according to the invention have $R_1=C_7$ akylenes, $R_4=C_4$ alkylenes, n=2 and $R_2$ and $R_3$ independently selected from the following groups:
—C(O)—(CH$_2$)$_{6-10}$—COOBu
—C(O)—(CH$_2$)$_{16}$—COOBu
—C(O)—(CH$_2$)$_{6-10}$—CH$_3$
—C(O)—(CH$_2$)$_{16}$—CH$_3$
—C(O)—(CH$_2$)$_{8-9}$—CO—(CH$_2$)$_{7-8}$—CH$_3$
—C(O)—(CH$_2$)$_{6}$—CO—(CH$_2$)$_{7}$—CH=CH—CH$_3$.

The vegetable oil derivatives in group A1 according to this invention may contain monomer triglycerides containing at least one $C_6$-$C_{24}$ dicarboxylic acid residue. Monomer triglycerides containing two $C_6$-$C_{24}$ dicarboxylic acid residues, where the dicarboxylic acids are the same or different, are particularly preferred. Also preferred are monomer triglycerides containing at least one $C_6$-$C_{24}$ dicarboxylic acid residue and at least one $C_6$-$C_{24}$ monocarboxylic acid residue having at least one ketone group and/or at least one hydroxyl group. The carboxylic acid residues present in the said monomer triglycerides are esterified with straight or branched $C_1$-$C_{12}$ monoalcohols.

Preferably, the mixtures of triglycerides (group A1 of vegetable oil derivatives according to this invention) also contain oligo glycerols such as diglycerol and triglycerol and their esters with mono- or dicarboxylic acids. Diglycerol and triglycerol esters comprising one or more $C_6$-$C_{24}$ dicarboxylic acids are preferred. Diglycerol and triglycerol esters comprising at least one saturated or unsaturated monocarboxylic acid containing one or more hydroxyl groups and/or a ketone group are also preferred.

The triglyceride mixtures comprising one or more oligomer structures in group A1) of vegetable oils preferably have a Mn of between 800 and 1000 Da, a kinematic viscosity of between 5 and 400 cSt at 100° C. and a glass transition temperature (Tg) of between −85° C. and −40° C., more preferably between −80° C. and −50° C., and even more preferably between −78° C. and −60° C. The number average molecular mass (Mn) is determined by GPC analysis following calibration and polystyrene standards.

Kinematic viscosity is calculated as the ratio between dynamic viscosity (measured by means of a HAAKE VT 500 rotational viscosity meter provided with a MV1 rotor at 100° C.) and density.

The glass transition temperature (Tg) is determined by differential scanning calorimetry with a single run from −100° C. to 30° C. with a rate of temperature rise of 20° C./min.

The said glyceride mixtures have a density which is preferably between 0.90 and 1.05 g/cm³, determined by measuring 100 mL of the said mixtures at 100° C.

Advantageously, the acid number of the mixtures is less than 50, preferably less than 10 and more preferably less than 5 mg KOH/g. By acid number is meant the quantity of KOH expressed in mg which is used to neutralise the acidity of 1 g of substance. The determination is made in accordance with standard ASTM D974-07 in the presence of phenolphthalein.

The degree of unsaturation of the triglyceride mixtures, expressed as the $I_2$ number and determined by titration according to the Wijs method is preferably between 0 and 140 g $I_2$/100 g.

The saponification number of the triglyceride mixtures, understood to be the quantity of KOH expressed in mg consumed in the saponification of 1 gram of substance, is preferably between 150 and 500 mg KOH/g.

The hydroxyl number of the triglyceride mixtures is preferably between 10 and 100 mg KOH/g. It is determined by titration with HCl in the presence of phenolphthalein of the residual KOH after reflux saponification for 60 minutes.

The triglyceride mixtures comprising one or more oligomer structures in group A1) of vegetable oils are insoluble in boiling water. These mixtures are however completely soluble in diethylether, ethyl alcohol, acetone and chloroform at ambient temperature. They are also characterised by high stability to hydrolysis.

The triglyceride mixtures containing one or more oligomer structures (group A1) of vegetable oil derivatives according to the invention may be prepared as described in international patent application entitled "Complex oligomeric structures" (PCT/EP2011/073492), the contents of the said application being incorporated here as a reference.

With reference to group A2) of vegetable oil derivatives according to this invention (triglycerides of one or more long chain carboxylic acids comprising at least one carboxylic acid containing vicinal hydroxyl groups), the partial or total oxidation product of the vegetable oils with $H_2O_2$ is particularly preferred. By way of example, mention is made of the derivatives obtained in accordance with the processes described in patent application WO/2008138892 and MI2009A002360. Sunflower oil derivatives and in particular sunflower oil having a high oleic acid content (HOSO) derivatives are of particular interest.

With reference to group A3) of vegetable oil derivatives according to this invention (polyol esters with at least one $C_6$-$C_{24}$ monocarboxylic acid and at least one $C_6$-$C_{24}$ dicarboxylic acid, these esters being different from triglycerides), polyols such as neopentylglycol, trimethylolpropane and pentaerythritol or in any event polyols containing primary hydroxyl groups are particularly preferred. Advantageously, the said esters contain monocarboxylic and dicarboxylic acids in ratios of preferably from 2:1 to 10:1. The monocarboxylic acids have $C_8$-$C_{24}$ chains; the dicarboxylic acids have $C_6$-$C_{24}$ chains.

In addition to vegetable oil derivatives the elastomer compositions may comprise extender oils selected from mineral oils and natural oils. The mineral oils may be of the paraffin, naphthenic or aromatic type and corresponding mixtures. Examples of mineral oils are DAE, TDAE and MES and RAE (Residual Aromatic Extract). By natural oils are meant all oils not derived from petroleum which are of animal origin (for example whale oil and fish oil) and plant origin.

Among the natural oils, particularly preferred are vegetable oils such as for example: peanut oil, Brassicaceae oils, safflower and coconut oils, sunflower oils having various oleic contents, jatropha oils, and linseed, olive, macadamia, mahua, neem, palm, papaver, pongamia, castor, rice, rubber tree seed (*Hevea brasiliensis*), maize, mustard, sesame and grape seed oils.

Preferably the compositions according to this invention comprise a mixture of extender oils preferably comprising at least 15% by weight with respect to the total content of extender oils of one or more vegetable oil derivatives selected from A1, A2 and A3 derivatives described above. In a particularly preferred embodiment the extender oils of the compositions according to this invention comprise one or more derivatives of vegetable oils selected from the A1, A2 and A3 derivatives described above. More preferably from the A1 derivatives.

As far as the fillers which can be used in compositions according to this invention are concerned, these are preferably selected from kaolin, barytes, clay, talc, calcium and magnesium, iron and lead carbonates, aluminium hydroxide, diatomaceous earth, aluminium sulfate, barium sulfate and biofillers containing starch. Among the biofillers containing starch those preferred are destructured or cross-linked starch as described in patent application no. MI2014A002189 and starch complexed with polymers containing hydrophilic groups intercalated with hydrophobic sequences and mixtures thereof such as for example described in patent EP 1 127 089 and the products marketed by Novamont S.p.A. as MATER-Bi 2030/3040 and MATER-Bi 1128 RR. Preferably the biofillers comprising starch are present in the compounds according to this invention in quantities of between 1 and 50 phr.

The compositions according to this invention preferably comprise one or more reinforcing fillers advantageously selected from carbon black, mineral fillers such as precipitated silica, inorganic compounds such as activated calcium carbonate or organic compounds such as resins having a high styrene content and phenol-formaldehyde resins.

As far as the carbon black is concerned, this is preferably used in quantities of between 10 and 150 phr, more preferably between 10 and 100 phr, even more preferably between 15 and 80 phr. In a preferred embodiment the carbon black has a specific surface area determined by nitrogen absorption of 40 to 150 m²/g and a DBP (dibutyl phthalate) absorption number of 70 to 180 ml/100 g determined in accordance with ASTM-D-2414. It is preferable that the carbon black should be in the form of small particles provided with a good oil absorption capacity. Even more preferable is a carbon black in which —OH groups have been introduced on the surface, given that these groups are reactive towards any bonding agents present in the composition.

As far as mineral fillers are concerned, these preferably comprise silica. Any type of silica may be used, for example anhydrous silica obtained by precipitation from sodium silicate having dimensions within the range 20-80 nm and a surface area of 35-150 m²/g. The quantity of silica preferably used in the compositions according to this invention will be from 10 to 150 phr, more preferably from 15 to 120 phr.

As far as bonding agents are concerned, these are preferably used in quantities of between 0.1 and 20 phr and are preferably selected from organosilanes, more preferably from trialkoxysilanes and dialkoxysilanes with functional groups. In a preferred embodiment the bonding agent is selected from one or more compounds having a general formula selected from:

$$(RO)_3SiC_nH_{2n}S_mC_nH_{2n}Si(OR)_3 \quad (I)$$

$$(RO)_3SiC_nH_{2n}X \quad (II)$$

$$(RO)_3SiC_nH_{2n}S_mY \quad (III)$$

in which R represents an alkyl group having from 1 to 4 carbon atoms, the three R being the same or different;
"n" represents an integer from 1 to 6,
"m" represents an integer from 1 to 6;
X represents a mercaptan group, an amino group, a vinyl group, a nitroso group, an imide group, a chlorine atom or an epoxy group;
Y represents a cyano group, a N,N-dimethyl thiocarbamoyl group, a mercaptobenzotriazole group or a methacrylate group.

Particularly preferred are organosilanes having at least one sulfur atom, in particular because of their reactivity towards partly hydrogenated rubber during the vulcanisation stage. Even more particularly preferred are organosilanes selected from bis(3-triethoxysilylpropyl)tetrasulfide; γ-mercaptopropyl methoxysilane; 3-thiocyanatopropyl triethoxysilane; trimethoxysilyl propyl mercaptobenzotriazole tetrasulfide. The quantity of bonding agent is preferably within the range 0.1 to 20 phr. In one embodiment of this invention the bonding agents comprising silicon compounds may also be compounds containing silicon which did not react during the preparation of the destructured starch silyl ethers according to this invention.

The elastomer compositions according to this invention preferably comprise at least one vulcanising agent. As far as vulcanising agents are concerned, these are selected from sulfur and compounds containing sulfur. Typical compounds containing sulfur are sulfur monochloride, sulfur dichloride, disulfide, polysulfide. Preferably the vulcanising compound comprises sulfur. In compositions according to this invention the quantity of vulcanising agent is preferably between 0.1 and 10 phr. A vulcanisation accelerator, a crosslinking activator and agent may also be used together with the vulcanising agent. Vulcanisation accelerators include derivatives of guanidine, amino-aldehydes, ammonia-aldehydes, thiazole derivatives, sulfene amido compounds, thioureas, thiourams, dithiocarbamates, xanthates. Typical activators are zinc oxide and stearic acids.

Typical examples of crosslinking agents include oxime derivatives, nitroso derivatives, polyamines, in addition to a free radical initiator such as an organic peroxide and an azo derivative.

As far as the anti-oxidant or anti-ageing agents are concerned, these include amine derivatives such as diphenyl amine and p-phenylene diamine, derivatives of quinoline and hydroquinone, monophenols, diphenols, thiobisphenols, impeded phenols and esters of phosphoric acid.

These compounds and their corresponding mixtures may be used in the range from 0.001 to 10 parts by weight per 100 parts of elastomer material (phr).

The compositions according to this invention comprising at least one elastomer and at least one destructured starch silyl ether may be prepared by any procedure known to those skilled in the art for the purpose. Preferably the compositions according to this invention can be obtained by mixing at least one elastomer and at least one destructured starch silyl ether according to the invention, as well as any further component, in the typical items of equipment used for the purpose, for example roller mixers, Banbury internal mixers, extruders, preferably at a temperature comprised between 50° C. and 190° C. and for a time preferably comprised between 4 and 14 minutes.

The compositions according to this invention may be prepared by mixing the components in a single stage or in various passes using methods known in the sector of elastomer compositions. In this latter case a first method comprises mixing first the elastomer components, the destructured starch silyl ethers and if used the other components apart from any vulcanising agents in a Banbury-type internal mixer. Subsequently the intermediate composition so obtained is mixed with vulcanising agents and accelerators in a roller mixer. In a second method, again in stages, the silica and the bonding agent are first mixed and caused to react and then the product of this reaction is mixed with the elastomers, the destructured starch silyl ethers and any other components, apart from any vulcanising agents which are mixed during a subsequent later stage.

In a preferred embodiment of the present invention, the compositions according to the invention are prepared by means of a process comprising the steps of:

a. extruding at least one starch in the presence of 1-40% by weight with respect to the weight of the starch of one or more plasticisers preferably comprising at least 2-90% by weight of glycerol with respect to the total weight of plasticisers, and in the presence of 0.1-5% by weight of at least one crosslinking agent, preferably glyoxal, with respect to the weight of the starch, at a temperature of between 110 and 250° C., preferably 130-180° C., obtaining a destructured starch;

b. mixing the said destructurized starch obtained in step a. with at least one silicon-containing compound at temperatures of between 110 and 250° C. and preferably between 130 and 180° C.;

c. mixing at least one elastomer and at least one destructured starch silyl ether obtained in step b, as well as any further component, at a temperature preferably comprised between 50° C. and 190° C. and for a time preferably comprised between 4 and 14 minutes.

In a further preferred embodiment, the compositions according to the invention are prepared by means of a process comprising the steps of:

a. extruding at least one native starch in the presence of 1-40% by weight with respect to the weight of the native starch of one or more plasticisers preferably comprising at least 2-90% by weight of glycerol with respect to the total weight of the plasticisers at a temperature of between 110 and 250° C., preferably 130-180° C., a-1. reacting the starch and plasticiser extruded in stage a, preferably under the same conditions as in stage a, with 0.1-5% by weight with respect to the weight of the starch of at least one crosslinking agent, preferably glyoxal;

b. mixing the destructured starch obtained at the end of stage a-1 with at least one silicon-containing compound at temperatures of between 110 and 250° C. and preferably between 130 and 180° C.;

c. mixing at least one elastomer and at least one destructured starch silyl ether obtained in step b, as well as any further component, at a temperature preferably comprised between 50° C. and 190° C. and for a time preferably comprised between 4 and 14 minutes.

The elastomer composition according to the invention thus obtained may be subsequently mixed, shaped and vulcanised in accordance with known methods. This invention also relates to the elastomer compositions formed and/or vulcanised which can be obtained from compositions according to this invention.

The invention will now be described with some examples which are intended to be illustrative without limiting it.

EXAMPLES

Methods Used for Characterisation
Extraction in Hexane

Approximately 2 g of sample ground up to a particle size of less than 500 microns were placed in a 50 ml flask with a magnetic stirrer and a quantity of 25 ml of hexane was added. The mixture then underwent gentle stirring at ambient temperature for one hour. The mixture was then filtered keeping the liquid fraction in a previously weighed 250 ml beaker. The solid fraction underwent further two washes in hexane as described previously.

At the end of the three washes the solid fraction was placed in a previously weighed weighing filter and dried in a stove at 60° C. for one hour.

The beaker containing the three liquid fractions was exposed to a gentle flow of air to cause the hexane to evaporate and on completion of the operation it was placed in a stove to dry at 60° C. for one hour. The mass of residue obtained is equivalent to the fraction of unreacted silane.

Karl-Fischer Titration

Karl-Fischer titration (in pyridine) was carried out using a KF Metrohm Titroprocessor 686 titration device controlled by the Dosimat 665 device. The Karl-Fischer reagent was titrated (correction factor) using sodium tartrate dissolved in methanol.

The solvents in which the samples were dispersed (N,N-dimethylformamide in molecular sieves—$H_2O<0.01\%$ m/m) was titrated to obtain the blank value, which had to be subtracted from the sample measurements.

The water content of the samples was measured by weighing approximately 1 g of sample in a 27 ml bottle to which were added 20 ml of N,N-dimethylformamide, together with a magnetic stirrer. The bottle was hermetically sealed and heated with gentle stirring to 80° C. on a magnetic plate until the sample had completely disaggregated (approximately 1 hour's mixing). The bottle was then left to cool to ambient temperature. 10 ml of the dispersion in N,N-dimethylformamide were then placed in the titrator cell together with 30 ml of pyridine in order to carry out the titration.

The water content of the sample was expressed as a percentage, having regard to the volume of Karl-Fischer reagent used with the sample (subtracted from that of the blank), the Karl-Fischer reagent correction factor and the mass of sample used for the measurement.

HPLC Analysis

The HPLC analysis was carried out using a Thermo Scientific Accela instrument provided with a refractive index detector and fitted with a Phenomenex Rezex ROA H+ column. An aqueous solution of 0.005 N of sulfuric acid was used as the eluent. The analyses were carried out at 65° C. with a flow of 0.6 ml/min.

Calibration curves for glycerine and citric acid were produced under the conditions described above using glycerine and citric acid solutions at different concentrations to calculate the instrument response factor.

In order to measure the citric acid and glycerine content a quantity of approximately 500 mg of sample was weighed and placed in a 100 ml flask containing 25 ml of distilled water for 24 hours at ambient temperature in order to extract the citric acid and the glycerine from the sample. A quantity of 20 µl of this solution was then injected into the system in order to carry out the HPLC analysis. The glycerine or citric acid contents were expressed as m/m percentages.

Phase Contrast Microscopy

Phase contrast optical microscopy was carried out using a Leitz Wetzlar Orthoplan optical microscope with a magnification (Polaroid 545) of x 400 with a Phaco 2 EF 40/0.65 objective lens, polarising filter no. 5.

Approximately 20 mg of sample were placed on an optical microscope slide together with a drop of distilled water. Using a spatula the sample was homogenised with the water until a slightly viscous paste was obtained. A spatula tip of this paste was placed between two optical microscopy slides and gently slid so as to obtain a semi-transparent film which was subsequently analysed.

SEM Microscopy

Vulcanised rubber specimens were broken up at ambient temperature, metallised with gold and observed using a FE-SEM ZEISS Supra 40 electron microscope at low magnifications (×200-800 with respect to the Polaroid 545) with secondary electrons at an acceleration potential of 10 kV and a working distance of approximately 8 mm.

UATR Analyses

The UATR analyses were carried out using a Perkin Elmer Spectrum 2 FT-IR/UATR spectrophotometer equipped with an accessory for high resolution reflection analyses. Approximately 20 mg of the ground sample (if solid) or a drop of liquid were placed on the diamond-coated accessory, subjected to a suitable pressure using the instrument's torque and scanned under MIR (medium infrared) radiation between 4000 and 450 $cm^{-1}$ carrying out 16 scans with a resolution of 4 $cm^{-1}$ for each spectrum.

$^1$H-NMR $^1$H-NMR analyses were carried out using a Bruker Avance 500 MHz Ultrashield spectrometer at 25° C. using a pulse time (pl) of 7.6 µs, a relaxation time (dl) of 3 s, and an acquisition time (aq) of 1.7 s and 64 scans.

Approximately 10 mg of sample were dissolved in 0.8 ml of dmso-d6 and the sample was analysed under the conditions reported above.

Mechanical Properties

The vulcanised test specimens were characterised using an Instron 4502 dynamometer equipped with long field extensimeters. The tensile properties were determined in accordance with standard ASTM D412 (type C dumbbell). The fatigue tests were carried out using an Instron 4502 dynamometer equipped with a 100 N load cell on type C ASTM D412 test specimens. The tests were carried out by applying a traversing speed of 250 mm/min with elongations of 10% and 50%.

The rebound tests were carried out using a Schob type pendulum in accordance with standard ASTM D7121.

Density

Density was measured at 23° C. in ethanol in accordance with standard ASTM D792.

Examples 1-3—Preparation of Destructured Starch Silyl Ethers from Native Starch

Preparation of Destructured Starch

A mixture comprising 80.3 parts by weight of native maize starch (C*GEL 03401, 12% of water), 14.4 parts of glycerol, 3.5 parts of an aqueous solution of glyoxal (40% m/m), and 1.8 parts of citric acid was fed to a dual screw extruder (diameter=21 mm, L/D=40) operating under the following conditions:
rpm (min$^{-1}$)=100;
temperature profile (° C.): 60-80-140-170-160-140-110-90;
throughput (kg/h): 2.5;
degassing: closed;
die temperature (° C.): 91;
die pressure (bar): 13-17.

The destructured starch obtained in this way was analysed by phase contrast optical microscopy as previously described in the "Phase contrast microscopy" section and demonstrated that structures which could be related to the native granular structure of the starch were completely absent.

Preparation of Silyl Ethers in Accordance with Examples 1-3

The destructured starch so obtained was used in three reactive extrusion processes adding different quantities of bis(3-trioxysilylpropyl)tetrasulfide (Si-69, produced by Evonik). The reactive extrusion processes were carried out in a twin screw extruder (diameter=21 mm, L/D=40) under the operating conditions shown in Table 1 below.

|  | Example 1 | Example 2 | Example 3 |
|---|---|---|---|
| Destructured starch (% by weight) | 95 | 90 | 85 |
| Si-69 (% by weight) | 5 | 10 | 15 |
| rpm (min$^{-1}$) | 100 | 150 | 150 |
| Temperature profile (° C.) | 60-120-160 × 4-155-150 | 60-120-160 × 4-155-150 | 60-120-160 × 4-155-150 |
| Throughput (kg/h) | 2.0 | 2.0 | 2.0 |
| Degassing | closed | closed | closed |
| die temperature (° C.) | 149 | 151 | 150 |
| die pressure (bar) | 3-4 | 3-4 | 4 |

The silyl ethers of destructured starch and the destructured starch used for their preparation were subjected to compositional analysis, being characterised by Karl-Fischer titration, HPLC analysis and extraction in hexane (Table 2).

TABLE 2

Analysis of the composition of the destructured starch and the silyl ethers according to examples 1-3

|  | Destructured starch (% by weight) | Example 1 (% by weight) | Example 2 (% by weight) | Example 3 (% by weight) |
|---|---|---|---|---|
| Starch | 75.5 | 70.6 | 70.0 | 65.7 |
| Glycerol | 11.3 | 13.8 | 10.3 | 10.0 |
| Water | 9.4 | 7.1 | 5.1 | 4.6 |
| Citric acid | 2.3 | 1.9 | 2.2 | 2.0 |
| Reacted Si-69 | 0 | 3.7 | 7.9 | 10.3 |
| Unreacted Si-69 | 0 | 1.5 | 3.1 | 6.1 |
| Glyoxal | 1.5 | 1.4 | 1.4 | 1.3 |

The hexane-soluble fractions were also analysed by H1-NMR spectrometry dissolving the samples in dmso-d6. The silyl ethers according to Examples 1-3 revealed the presence of a signal at 1.06 ppm attributed to the three protons of the ethoxy group of the silane $CH_3$—$CH_2$—O—Si.

Examples 4-8

The silyl ethers according to Examples 1-3, a commercial complexed starch-based biofiller as well as a mixture of starch and plasticizer were used to prepare the compositions shown in Table 3.

TABLE 3

Compositions in Examples 4-8

|  | Example 4 phr | Example 5 phr | Example 6 phr | Example 7 (comparative) phr | Example 8 (comparative) phr |
|---|---|---|---|---|---|
| SBR rubber[1] | 100 | 100 | 100 | 100 | 100 |
| Silyl ether (example 1)[2] | 11.05 | — | — | — | — |
| Silyl ether (Example 2)[2] | — | 11.05 | — | — | — |
| Silyl ether (Example 3)[2] | — | — | 11.05 | — | — |
| Biofiller[3] | — | — | — | 9.6 | — |
| Starch/water (75/25) | — | — | — | — | 11.05 |
| Silica[4] | 54 | 54 | 54 | 54 | 54 |
| Silane[5] | 4.32 | 4.32 | 4.32 | 5.8 | 6.04 |
| Stearic acid | 1.5 | 1.5 | 1.5 | 1.5 | 1.5 |
| Extender oil[6] | 17 | 17 | 17 | 17 | 17 |
| Antidegradation agent[7] | 1.5 | 1.5 | 1.5 | 1.5 | 1.5 |
| ZnO | 2.6 | 2.6 | 2.6 | 2.6 | 2.6 |
| Sulfur | 1 | 1 | 1 | 1 | 1 |
| Vulcaniser 1[8] | 1.3 | 1.3 | 1.3 | 1.3 | 1.3 |
| Vulcaniser 2[9] | 1.5 | 1.5 | 1.5 | 1.5 | 1.5 |

[1]SBR1502 (Versalis Europrene),
[2]Density of the silyl ethers = 1.45 g/cm$^3$,
[3]Mater-Bi 1128RR (starch complex with poly(ethylenevinyl alcohol) produced by Novamont S.p.A. - density 1.26 g/cm$^3$),
[4]Zeosil 1165 MP (Rhodia),
[5]Si-69 (Evonik),
[6]TDAE (Repsol Extensoil),
[7]Vulkanox HS/LG (Lanxess),
[8]Vulkacite DM/MG (Lanxess),
[9]Vulcacite D- EG/C (Lanxess)

In the compositions in Examples 4-6 the quantities of silyl ethers and biofiller added were modulated so as to obtain equal volumes of additives, having regard to their respective densities. In addition to this, the quantity of silane added at this stage was modulated to obtain a total quantity of silane equal to that in Example 7, taking into account the unreacted silane present in the destructured starch silyl ethers.

The compositions in Examples 4-7 were prepared in accordance with the following method. SBR rubber was loaded into a 300 cm$^3$ Banbury Pomini Farrel mixer and mixed at 80 rpm for 30 seconds at T=133° C. The quantities of SBR rubber and the other components used were selected so as to obtain a final volume filling the mixer chamber to 86%. The silica and the extender oil were added to the SBR rubber in three equal aliquots, mixing the system for 30 seconds between one addition and the next. The silane was added together with the second aliquot of silica and extender oil, while the other components (apart from the vulcanising agents) were added together with the third aliquot of silica and extender oil. The mixture was then further mixed until a chamber temperature of 160° C. was reached. Once this temperature had been reached stirring was reduced to 60 rpm and mixing continued under these conditions for a further two minutes.

The composition of Example 8 (reported in Table 3) was instead prepared in accordance with the following method: SBR rubber was loaded into a 300 cm$^3$ Banbury Pomini Farrel mixer and mixed at 80 rpm for 30 seconds at T=133° C. The quantities of SBR rubber and the other components used were selected so as to obtain a final volume filling the mixer chamber to 86%. The mixture of starch and water was added to the SBR rubber in two equal aliquots, mixing the system for 30 seconds between one addition and the next. The silica and the extender oil were added to the SBR rubber in three equal aliquots, mixing the system for 30 seconds between one addition and the next. The silane was added together with the second aliquot of silica and extender oil, while the other components (apart from the vulcanising agents) were added together with the third aliquot of silica and extender oil. The mixture was then further mixed until a chamber temperature of 160° C. was reached. Once this temperature had been reached stirring was reduced to 60 rpm and mixing continued under these conditions for a further two minutes.

The mixtures obtained in Examples 4-8 were all discharged and underwent a further stage of mixing (known as remill) in the 300 cm³ Banbury Pomini Farrel mixer set to 140° C., 80 rpm (chamber filling volume 86%). The mixtures were allowed to mix for the time necessary to reach 160° C. and then again discharged. The purpose of the remill operation is to ensure a uniform distribution of all the components in the volume of the mixture.

The mixtures finally underwent vulcanisation. The mixtures were again loaded into the 300 cm³ Banbury Pomini Farrel mixer (chamber filling volume 86%) and mixed at 70° C., 60 rpm for 30 seconds. The vulcanising agents were then added and after two minutes of further mixing the mixtures together with the vulcanising agents were discharged and vulcanised at 160° C. for 30 minutes by compression molding.

The vulcanised compositions so obtained were then mechanically characterised (Table 4).

TABLE 4

Mechanical characterisation of the compositions according to Examples 4-6 and 7 and 8 (comparative)

| Examples | $\sigma_b$ (MPa) | $\varepsilon_b$ (%) | $E_{100}$ (MPa) | $E_{200}$ (MPa) | $E_{300}$ (MPa) | Rebound (%) | 10% deformation hysteresis (mJ) cycle I | 10% deformation hysteresis (mJ) cycle V | 50% deformation hysteresis (mJ) cycle I | 50% deformation hysteresis (mJ) cycle V |
|---|---|---|---|---|---|---|---|---|---|---|
| 4 | 15.8 | 317 | 3.1 | 4.0 | 4.8 | 52 | 1.3 | 0.9 | 31.4 | 16.3 |
| 5 | 17.4 | 331 | 3.2 | 4.1 | 5.0 | 51.7 | 1.2 | 0.8 | 29.4 | 16.3 |
| 6 | 15.9 | 298 | 3.4 | 4.3 | 5.4 | 50.3 | 1.5 | 0.9 | 34 | 18.4 |
| 7 (comp.) | 18.6 | 314 | 3.3 | 4.6 | 5.7 | 49.6 | 1.9 | 1.2 | 44.5 | 22.3 |
| 8 (comp.) | 11.0 | 280 | 2.9 | 3.5 | — | 45.2 | 5.5 | 2.4 | 102 | 37.8 |

As will be seen, the compositions according to the invention in Examples 4-6 demonstrate $\sigma_b$, $\varepsilon_b$, $E_{100}$, $E_{200}$, $E_{300}$ and Rebound mechanical properties which are substantially equivalent to those of comparative Example 7, and further show improved hysteresis properties, as will be seen from the lower dissipated energy values (in mJ) in both deformation-recovery stress cycles I and V. The composition according to comparative Example 8, instead, shows the worst mechanical and hysteresis properties.

The invention claimed is:

1. A composition comprising at least one elastomer and at least one silyl ether of destructurized starch in which at least one oxygen atom of the destructurized starch is covalently linked with at least one silicon atom and/or at least one silicon-containing compound, said silyl ether being obtained by means of a process comprising the steps of:
   a. preparing destructurized starch;
   b. mixing said destructurized starch with at least one silicon-containing compound at temperatures between 110 and 250° C.;

in which during step a, or after step a and before step b, adding at least one crosslinking agent selected from the group consisting of aldehydes, polyaldehydes and anhydrides;

wherein:

said silicon-containing compound is selected from the group consisting of organosilanes having the general formula selected from:

$(RO)_3SiC_nH_{2n}S_mC_nSi(OR)_3$tm (I)

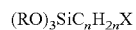$(RO)_3SiC_nH_{2n}X$ (II)

$(RO)_3SiC_nH_{2n}S_mY$ (III)

in which

"R" represents an alkyl group having from 1 to 4 carbon atoms, the three R being the same or different;

"n" represents an integer from 1 to 6,

"m" represents an integer from 1 to 6;

"X" represents a mercaptane group, an amine group, a vinyl group, a nitroso group, an imide group, a chlorine atom or an epoxy group;

"Y" represents a cyano group, an N,N-dimethyl thiocarbamoyl group, a mercaptobenzothriazole group, or a methacrylate group; and said elastomer is selected from natural rubbers and synthetic rubbers, and said synthetic rubbers are selected from the group consisting of dienic homopolymers, block copolymers styrene-butadiene-styrene, random copolymers styrene-isoprene, block copolymers styrene-isoprene-styrene, block copolymers acrylonitrile-butadiene, and random copolymers of vinylarene-conjugated dienes.

2. The composition according to claim 1, in which said step a. of preparing destructurized starch is performed in the presence of 1-40% by weight, with respect to the weight of starch, of one or more plasticizers selected from the group consisting of water and polyols having from 2 to 22 carbon atoms.

3. A composition according to claim 2, and further comprising 1-20% by weight of at least one silicon-containing compound not linked to an oxygen atom of starch.

4. The composition according to claim 1, in which said crosslinking agent is glyoxal.

5. A composition according to claim 4, and further comprising 1-20% by weight of at least one silicon-containing compound not linked to an oxygen atom of starch.

6. The composition according to claim 5, in which said step a. of preparing destructurized starch is performed in the presence of 1-40% by weight, with respect to the weight of starch, of one or more plasticizers selected from the group consisting of water and polyols having from 2 to 22 carbon atoms.

7. The composition according to claim 4, in which said step a. of preparing destructurized starch is performed in the presence of 1-40% by weight, with respect to the weight of starch, of one or more plasticizers selected from the group consisting of water and polyols having from 2 to 22 carbon atoms.

8. The composition according to claim 1, and further comprising 1-20% by weight of at least one silicon-containing compound not linked to an oxygen atom of starch.

9. The composition according to claim 8, in which said crosslinking agent is glyoxal.

10. The composition according to claim 1, comprising from 1 to 70 phr of said silyl ether of destructurized starch.

11. A composition according to claim 10, and further comprising 1-20% by weight of at least one silicon-containing compound not linked to an oxygen atom of starch.

12. The composition according to claim 11, in which said crosslinking agent is glyoxal.

13. The composition according to claim 10, in which said step a. of preparing destructurized starch is performed in the presence of 1-40% by weight, with respect to the weight of starch, of one or more plasticizers selected from the group consisting of water and polyols having from 2 to 22 carbon atoms.

14. The composition according to claim 10, in which said crosslinking agent is glyoxal.

* * * * *